May 26, 1925.  
H. T. FARNSWORTH  
OSCILLATING ENGINE  
Filed July 26, 1922 　　3 Sheets-Sheet 1

WITNESSES  
Frank B. Cook  
Harry E. Seidel

John T. Farnsworth  
Administrator of the Estate of  
H. T. Farnsworth  
Deceased INVENTOR

BY  
ATTORNEY

May 26, 1925.  1,539,307
H. T. FARNSWORTH
OSCILLATING ENGINE
Filed July 26, 1922   3 Sheets-Sheet 2

John T. Farnsworth
Administrator of the Estate of
H. T. Farnsworth
Deceased INVENTOR

WITNESSES

May 26, 1925.  1,539,307

H. T. FARNSWORTH

OSCILLATING ENGINE

Filed July 26, 1922  3 Sheets-Sheet 3

John T. Farnsworth
Administrator of the Estate of
H. T. Farnsworth
Deceased  INVENTOR

WITNESSES

BY

ATTORNEY

Patented May 26, 1925.

1,539,307

UNITED STATES PATENT OFFICE.

HENRY T. FARNSWORTH, DECEASED, LATE OF LIGONIER, PENNSYLVANIA; BY JOHN T. FARNSWORTH, ADMINISTRATOR, OF EVERSON, PENNSYLVANIA, ASSIGNOR OF ONE-HALF TO JAMES S. BRADDOCK, OF MOUNT PLEASANT, PENNSYLVANIA.

OSCILLATING ENGINE.

Application filed July 26, 1922. Serial No. 577,636.

*To all whom it may concern:*

Be it known that I, JOHN T. FARNSWORTH, a citizen of the United States, residing at Everson, county of Fayette, State of Pennsylvania, administrator of the estate of HENRY T. FARNSWORTH, late a citizen of the United States, and a resident of Ligonier, in the county of Westmoreland and State of Pennsylvania, deceased (as by reference to the duly certified copy of letters of administration filed in the Patent Office will more fully appear), do hereby declare that the said HENRY T. FARNSWORTH invented a new and useful Improvement in Oscillating Engines, of which the following is a specification.

This invention relates to oscillating engines, designed to be operated by either compressed air, steam or water, and has for its object the provision of an improved slide valve controlling means whereby the operation of said valve may be altered so as to reverse the operation of the engine.

Another object of the invention is the provision of an improved operating rod or stem for the valve which controls the flow of power fluid to the cylinder, said rod being constructed to function as an exhaust passage for the spent fluid from the cylinder.

A further object is to construct the engine with as few parts as possible, and those parts made light in weight and yet strong so that the engine may be built cheaply.

The invention will be best understood from a consideration of the following detailed description taken in connection with the accompanying drawings forming part of this specification, with the understanding, however, that the invention is not confined to any strict conformity with the showing in the drawings, but may be changed and modified so long as such changes and modifications mark no material departure from the salient features of the invention as expressed in the appended claims.

In the drawings:—

Figure 1:
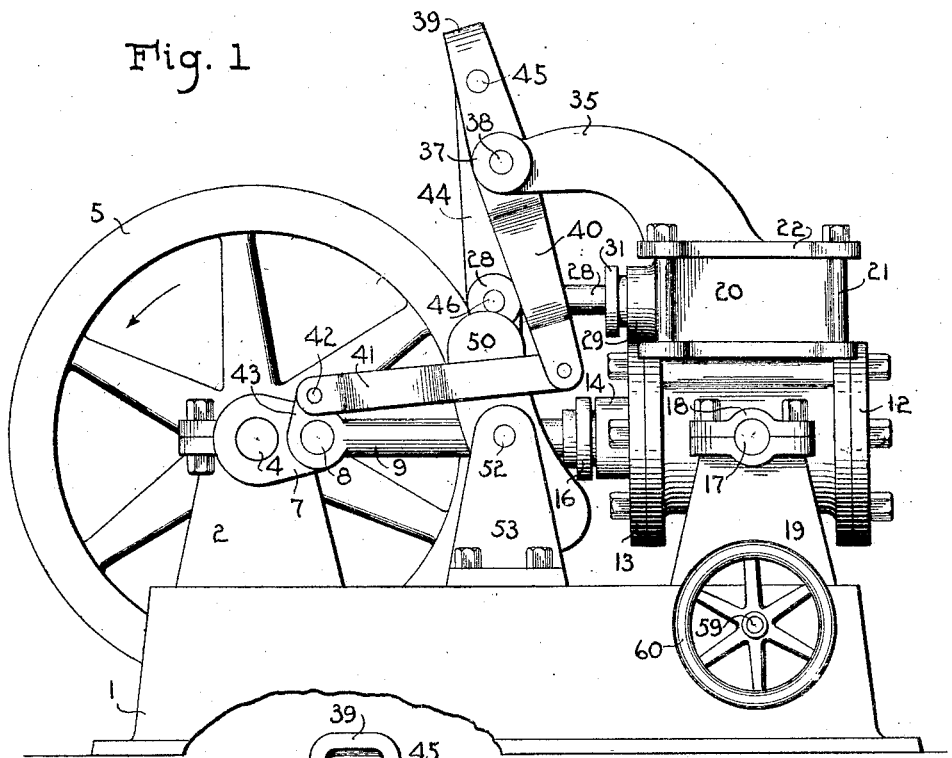
Fig. 1 is a side elevation of the oscillating engine.
Figure 7:
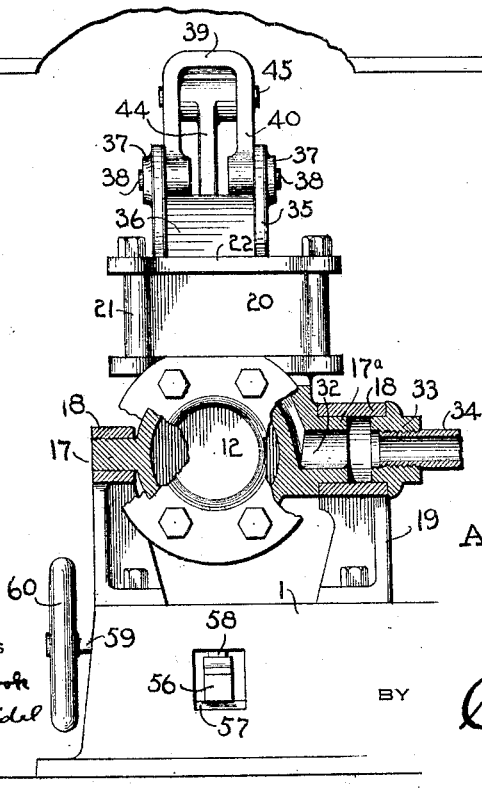
Fig. 7 is an end view of the engine with parts in section showing the inlet passages for the power fluid which is formed in pivotal mounting for the oscillating cylinder.

Referring to the drawings, 1 represents a base provided with standards 2 having bearings 3 in which is mounted a shaft 4. A fly wheel 5 is mounted upon the main shaft 4 and operates in a slot 6 formed in the base 1. On one end of the shaft 4 is provided a crank 7, to which is connected, by means of a crank pin 8, a piston rod 9.

A piston 10 is secured in any approved manner to one end of the piston rod 9 and is adapted to reciprocate in an oscillating cylinder 11. The outer end of the cylinder is closed by a head 12, while the inner end is closed by a head 13 having a stuffing box 14, through which the rod 9 is adapted to reciprocate, said stuffing box being provided with the usual packing 15 and a gland 16 screwed into the outer end of said box.

The cylinder 11 is mounted so as to be oscillated by the oscillating and reciprocating piston rod 9, and is provided with trunnions 17 and 17ª mounted in bearings 18, which are located on the upper ends of spaced standards 19, the standards being mounted on that end of the base member 1 which is opposite to the mounting of the standards 2.

A fluid chest 20 is mounted on the upper side of the cylinder 11 by means of the bolts 21, and is adapted to oscillate with the cylinder 11. A cap 22 closes the top of the chest 20 and is held down upon the chest by the same bolts 21 which fasten the chest to the cylinder 11.

Ports 23 and 24 in the wall of the cylinder 11 connect the chest 20 with the cylinder 11. The inner end of the port 23 opens into the outer end of the cylinder 11, while the inner end of port 22 opens near the inner end of said cylinder. The other ends of the ports are located adjacent each other, and are controlled by a slide valve 25 provided with a curved port 26, one end of which is adapted to aline with the outer ends of the ports 23 and 24, where they open into the chest 20, while the other end of the exhaust port 26 alines with a passage 27 formed in a hollow reciprocating rod 28, which is connected with the slide valve 25, and is adapted to operate the said valve when the engine is oscillated.

The hollow rod 28 passes through a stuffing box 29 provided with the usual packing 30 and a gland 31 to prevent the escape of steam or compressed air from the chest 20.

Compressed air is admitted through a passage 32 formed in the hollow trunnion 17ª which is rotatably mounted in one of the standards 19, and forms part of the pivotal mounting for the cylinder of the engine. A coupling 33 is mounted in the bearing 18, into which coupling is screwed one end of a pipe 34, adapted to supply compressed air to the chest 20 by means of the passage 32.

Integrally formed with the closure 22 for the chest 20 are a pair of spaced bracket arms 35, connected by a curved reinforcing member 36, and provided at their outer free ends with bearings 37, in which are mounted pins 38, upon which is pivotally mounted the U-shaped portion 39 of a curved oscillating lever 40. The lower end of the oscillating lever 40 is pivotally connected to one end of a curved link 41, the other end of said link being bifurcated and pivotally connected to a pin 42, which is mounted upon a projection 43, formed on the pivotal connection between the piston rod 9 and the crank pin 8, so that as the shaft 4 is rotated, the pin 42 will describe a circular path.

Figure 2:
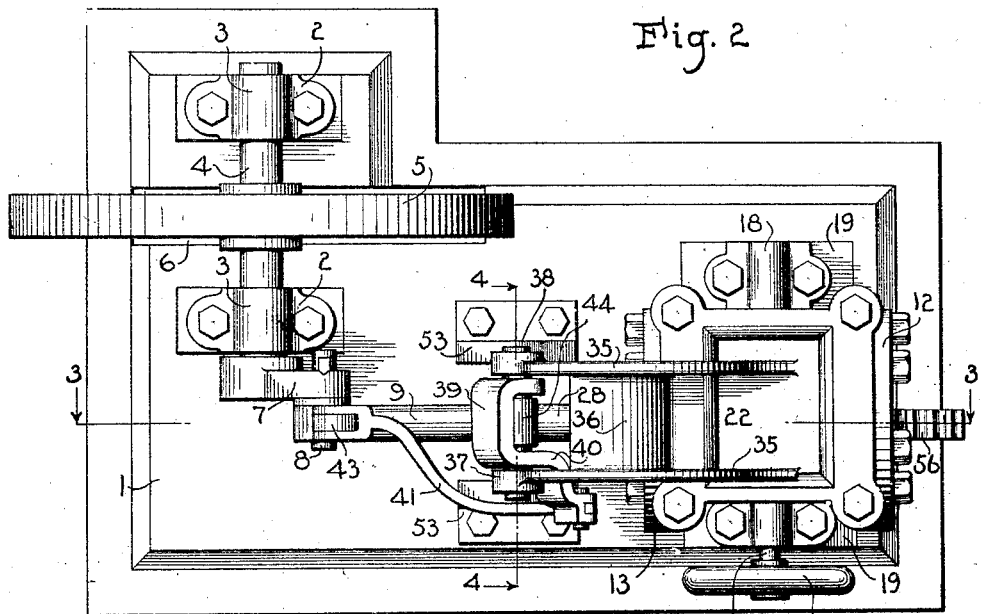
Fig. 2 is a plan view of the same.
Figure 4:
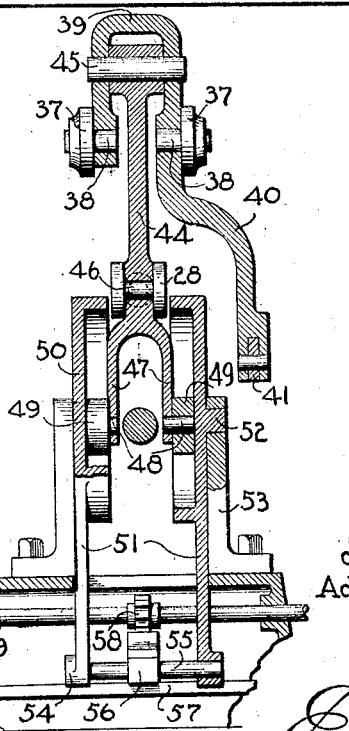
Fig. 4 is a transverse vertical section taken along the line 4—4 of Fig. 2.

An oscillating arm 44 has its upper end journaled on a pin 45, which is secured in the U-shaped portion 39 of the oscillating lever 40, the latter being curved outwardly and downwardly so that it will be free to oscillate without interfering with other parts of the valve operating mechanism, as shown in Figs. 2 and 4. The inner end of the hollow rod or valve stem 28 is bifurcated, and is adapted to span an intermediate portion of the oscillating arm 44 (Fig. 4), and is pivotally connected to the same by means of a pin 46. The lower end of the oscillating arm 44 is provided with spaced depending arms 47, on the outer free ends of which are mounted pins 48, having rollers 49 mounted thereon, which rollers are adapted to ride in curved tracks 50.

These curved tracks 50 are formed integrally with the inner faces of a pair of spaced oscillating levers 51, which are pivotally mounted at 52 in spaced brackets 53. The lower free ends of the arms 51 are provided with a bearing 54, in which is journaled a head 55 of a T-shaped slidable rack 56. The rack is slidable in guides 57 mounted in any appropriate manner in the base 1 of the engine.

Figure 3:
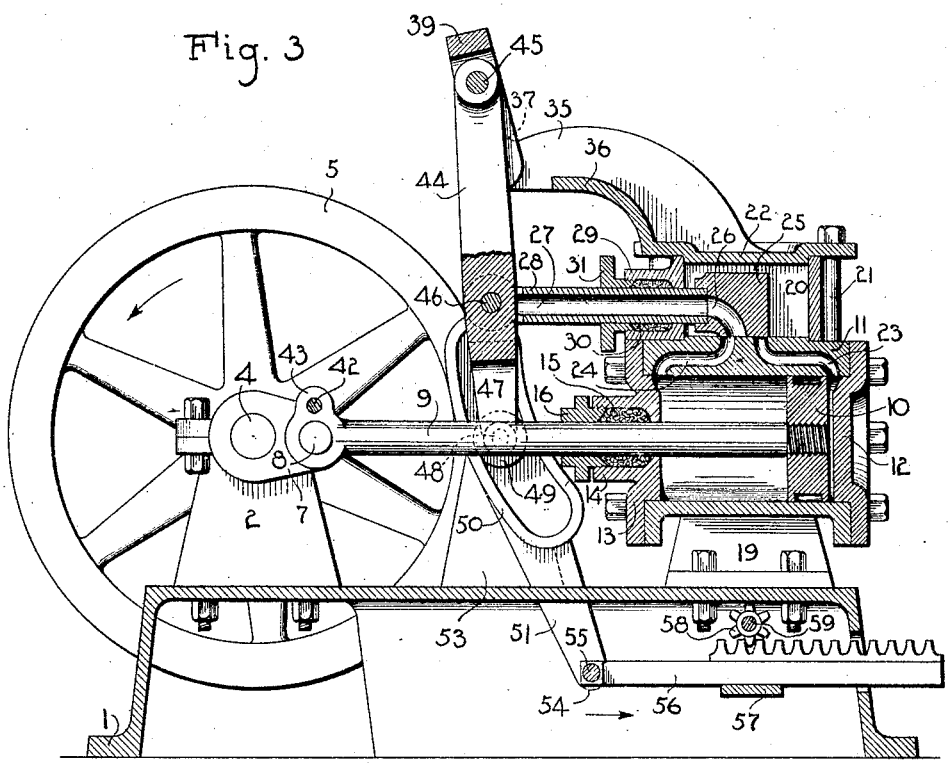
Fig. 3 is a vertical section taken along the line 3—3 of Fig. 2.
Figure 5:
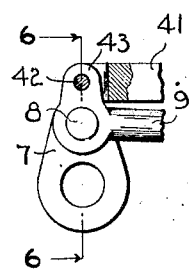
Fig. 5 is a fragmentary view in detail showing the piston rod and the lead for operating the valve mechanism.
Figure 6:
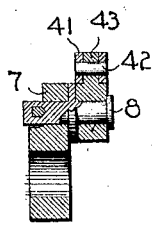
Fig. 6 is a section taken along the line 6—6 of Fig. 5.
Figure 8:
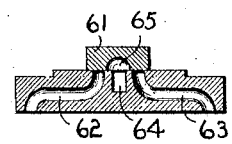
Fig. 8 is a section of the common slide valve and the wall of a cylinder when the oscillating engine is operated by steam or water pressure.

The rack 56 is in mesh with a spur gear 58 which is mounted upon and operated by a shaft 59, that is in turn controlled by a hand wheel 60 projecting or spaced to one side of the base 1.

Where the engine is operated either by steam or water pressure, the form of slide valve 25 shown in Fig. 3, will be replaced by the common steam slide valve 61, with ports 62 and 63 in the cylinder wall for the admission and exhaust of either the steam or the water from the cylinder. A common exhaust port 64 in the cylinder wall is located between the outlet ends of the ports 62 and 63, so that the exhaust port 64 and either one of the ports 62 or 63 may be alternately connected with the port 65 in said slide valve, whereby the steam or water may be exhausted from the cylinder. When steam or water is used, the trunnion 17 for the cylinder 11 is enlarged in a manner similar to the hollow trunnion 17ª, and provided with a steam passage connected with the exhaust port 64 whereby the steam is carried away from the cylinder.

The operation of my engine is as follows:—

While I have stated that the engine is capable of being operated either by steam, water or compressed air, I prefer to use it as a compressed air oscillating engine. The compressed air from the supply pipe 34 enters the passage 32 in the hollow trunnion 17ª and is admitted to the valve chamber 20. The levers 51 are set in such a position by the manipulation of the hand wheel 60 that the valve 25 will open the ports 23 and 24 to the chest 20, and to the exhaust passage 27 in the proper sequence to drive the crank shaft in the direction desired. For example, with the parts in the positions shown in the Figures 1 and 3, the fly wheel is passing toward the center moving in the direction of the arrow. The rack 56 has been adjusted in the direction shown by the arrow, so that the tracks 50 and lever 51 are inclined downwardly to the right. As the pin 42 is carried upwardly the cylinder oscillates to the right or in a clockwise direction, and carries the pin 45 upwardly, while the rollers 49 follow the tracks 50 upwardly and to the left, swinging about the pin 45 as a center and moving the valve 25 to the left to admit compressed air from the chest 20 through the port 23 into the right hand end of the cylinder. At the same time the left hand end of the cylinder is exhausted through the port 24 and passageways 26 and 27. When the crank pin 8 reaches the lower part of its revolution, the rollers 49 ride on the lower half of the tracks 50, and the valve 25 is carried to the right of the position shown in Figure 3, opening the left hand of the cylinder to the pressure chest 20, and connecting the right hand end of the cylinder with the exhaust passageway.

When the hand wheel 60 is manipulated so that the arcuate tracks 50 are in a certain intermediate position, manipulation of the cylinder will not change the relative position of the valve 25, and the engine will come to a stop.

If the hand wheel 60 is manipulated to move the rack 56 to the extreme left hand position, the arcuate tracks 50 and lever 51 will then be inclined downwardly and to the left. In this position of adjustment, whenever the pin 42 is in the upper half of its path, the valve 25 will be thrown to the right and pressure will be admitted to the left hand end of the cylinder, while the right hand end is in communication with the exhaust passage. When the pin 42 is in the lower half of its path, the valve 25 will be in the left hand end of the chest 20 and pressure will be admitted to the right hand end of the cylinder, while the left hand end of the cylinder is exhausted. Thus, the operation of the engine is reversed.

It will be seen, therefore, that by manipulation of the hand wheel 60, the valve actuating means may be so adjusted as to rotate the crank shaft in either direction as desired, or it may be so adjusted that the valve will remain stationary with the engine inoperative.

What is claimed is:—

1. In an oscillating engine, an oscillating cylinder, a piston reciprocable therein, a valve chest, ports connecting the valve chest with opposite ends of the cylinder, a valve controlling said ports, a rod connected with the valve, means operated by the engine for oscillating the rod, said means comprising a lever intermediately fulcrumed, a link connecting one end of the lever with the main shaft of the engine, an oscillatory arm having one end pivotally connected to the opposite end of said lever, said oscillatory arm having a connection intermediate its ends to the valve rod, arcuate tracks between which the opposite end of the oscillatory arm is guided, and means for shifting the position of said tracks to reverse the engine.

2. In an engine operated by fluid pressure, an oscillating cylinder, a piston reciprocable therein, a valve chest, ports connecting the valve chest with the opposite ends of the cylinder, a valve controlling the ports between the chest and the cylinder, a hollow rod connecting the valve with the operating parts of the engine, said valve having a passageway connected with the hollow rod and adapted to act as an exhaust passage for the spent fluid, a lever intermediately fulcrumed on a projecting part of the cylinder, a link connecting one end of the lever with the main shaft of the engine, an oscillatory arm pivotally connected at one end to the other end of said lever and connected intermediate its ends to the valve rod, arcuate tracks between which the opposite end of the oscillatory arm is guided, and means for shifting the position of said tracks to reverse the engine.

3. In an engine of the character described, an oscillating cylinder, a piston therein, a crank shaft having a crank operatively connected to one end of the piston, said piston having a projection adjacent the wrist pin, a link pivotally connected at one end to said projection, a lever having one end pivotally connected to the other end of said link, said lever being intermediately fulcrumed on a projecting part of the cylinder, an oscillatory arm pivotally connected at one end to the opposite end of said lever, an adjustable guideway in which the other end of said oscillatory arm is guided, a valve rod having one end pivoted to the intermediate portion of said oscillatory arm, a valve chest having ports connected with the opposite ends of the cylinder, a valve mounted in said chest and connected with said valve rod, and operable thereby to control said ports.

4. In an oscillating engine, an oscillating cylinder, a piston therein, a valve chest, ports connecting the valve chest with the opposite ends of the cylinder, a valve controlling said ports, a rod connected to the valve, and means operated by the engine for oscillating the rod, said operating means comprising a lever pivoted intermediate its ends, a swinging arm pivotally mounted at one end to one end of the lever and connected intermediate its ends to the operating rod for the valve, a link connecting the other end of the lever with the crank shaft of the engine, and means connected with the other end of the swinging arm for varying the movement of the valve.

5. In an oscillating engine, an oscillating cylinder, a piston therein, a valve chest, ports connecting the valve chest with the opposite ends of the cylinder, a valve controlling said ports, a rod connected with the valve, and means operated by the engine for oscillating said rod, said operating means comprising an oscillating lever, a swinging arm pivotally connected to the lever and also connected to the operating rod for the valve, a link connecting the oscillating lever with the main shaft of the engine, means connected with the swinging arm for varying the movement of the valve, comprising rollers mounted on the swinging arm, pivotally mounted tracks for the rollers, and means for varying the position of the tracks for varying the movement of the valve.

6. In an oscillating engine, an oscillating cylinder, a piston therein, a main shaft operated by the piston, a valve chest, ports connecting said valve chest with the opposite ends of the cylinder, a slide valve in said chest for controlling said ports, a rod connected with the valve for moving the same, a lever having one of its ends of U-shaped formation, a pin mounted in the U-shaped portion of the lever, a link connecting the other end of the lever with the main shaft of the engine and adapted to oscillate said lever, a swinging arm pivotally mounted on said pin and having pivotal connections at an intermediate point with the valve rod, a pair of rollers mounted on the other end of the swinging arm, pivotally mounted curved tracks for the rollers, each of said tracks being provided with depending arms, and manual means for moving the depending arms for changing the relative positions of the curved tracks and thereby varying the position of the valve.

7. In an oscillating engine, a cylinder mounted for oscillation, a piston cooperating therewith, a crank shaft operated by the piston, a valve chest located in proximity to the cylinder, ports connecting said valve chest with opposite ends of the cylinder, a slide valve in said chest for controlling said ports, a rod connected with the valve for operating the same, a lever fulcrumed on a projecting part of the cylinder, a link pivotally connected at one end to said lever and at the other end to the piston near the connection of the latter with the crank shaft, a swinging arm pivotally connected to said lever and having a pivotal connection with the valve rod, a pair of rollers mounted on the swinging arm, pivotally mounted arms having tracks between which said rollers are guided, and means for adjusting the position of said pivoted arms so as to change the relative position of the valve for driving the crank shaft in either direction.

8. In an oscillating engine, a cylinder mounted for oscillation, a piston operable therein, a crank shaft operated by the piston, a valve chest having ports leading to opposite ends of the cylinder, a slide valve in said chest for controlling said ports, a rod connected with the valve for actuating the same, a lever intermediately fulcrumed on a projecting part of the cylinder, a link pivotally connected at one end to the lower end of said lever and connected at the other end to the piston near the connection of the latter with the crank shaft, a swinging arm pivotally connected at its upper end to the upper end of the lever and having an intermediate pivotal connection with the valve rod, a pair of rollers carried by the lower end of the swinging arm, pivotally mounted curved tracks for guiding said rollers, depending arms connected with the tracks, a rack connected to the depending arms, a gear meshing with said rack and rotatable to change the relative position of the curved tracks, and to shift the valve so as to reverse the operation of the engine.

In testimony, that I claim the foregoing as the invention of HENRY T. FARNSWORTH, I have hereto affixed my signature.

JOHN T. FARNSWORTH,
*Administrator of the estate of Henry T. Farnsworth, deceased.*